United States Patent [19]

Kühbauch

[11] Patent Number: 4,813,099

[45] Date of Patent: Mar. 21, 1989

[54] WIPING DEVICE FOR WINDOWS OF POWER VEHICLES

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 52,733

[22] Filed: May 20, 1987

[30] Foreign Application Priority Data

Jun. 7, 1986 [DE] Fed. Rep. of Germany ....... 3619234

[51] Int. Cl.$^4$ .............................................. B60S 1/26
[52] U.S. Cl. ................................ 15/250.19; 15/250.21
[58] Field of Search ........... 15/250.21, 250.19, 250.20, 15/250.34, 250.35; 74/96, 98, 99 R

[56] References Cited

U.S. PATENT DOCUMENTS 4,648,148  3/1987  Egner-Walter et al. .......... 15/250.21
4,698,873  10/1987  Aoki et al. ........................ 15/250.21

FOREIGN PATENT DOCUMENTS 521964  3/1955  Italy .................................. 15/250.35
510066  7/1939  United Kingdom ............. 15/250.19

Primary Examiner—Harvey C. Hornsby
Assistant Examiner—Scott J. Haugland
Attorney, Agent, or Firm—Michael J. Striker

[57] ABSTRACT

A wiping device for windows of power vehicles, comprises a swingably movable wiping lever, a swinging shaft having a swinging axis, a guiding piece connected with the swinging shaft, an elongated lifting element which is radially displaceable relative to the swinging axis, the lifting element having an end which faces away from the swinging axis, a wiper arm articulately connected with the side of the lifting element, a wiping blade arranged on the wiper arm, a spring element arranged to press the wiping blade against a pane to be wiped, so that the wiping blade is subjected via the wiper blade to a swinging movement and via the lifting element to a displacement movement which is superposed upon the swinging movement and extends transversely to the swinging movement, the lifting element being provided with a movable abutment shoulder which extends transverse to its direction of elongation, the guiding piece having a rear counter shoulder as considered in directional movement of the lifting element and cooperating with the abutment shoulder, the abutment shoulder abutting against the counter shoulder and being in working connection with the wiping blade so that its relative movement relative to the wiping blade acts upon the wiping blade against a pressing action of the spring element.

12 Claims, 2 Drawing Sheets

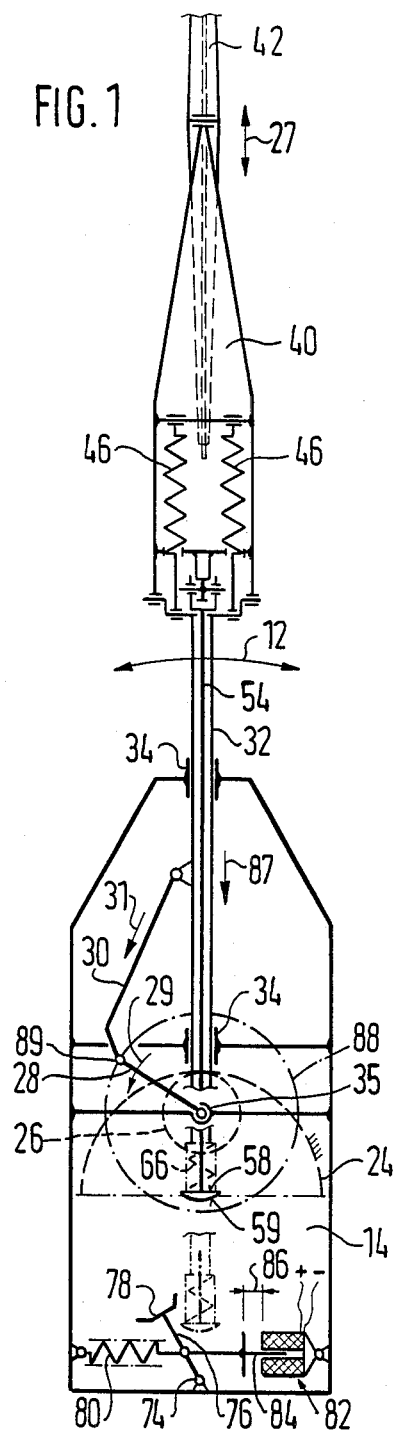
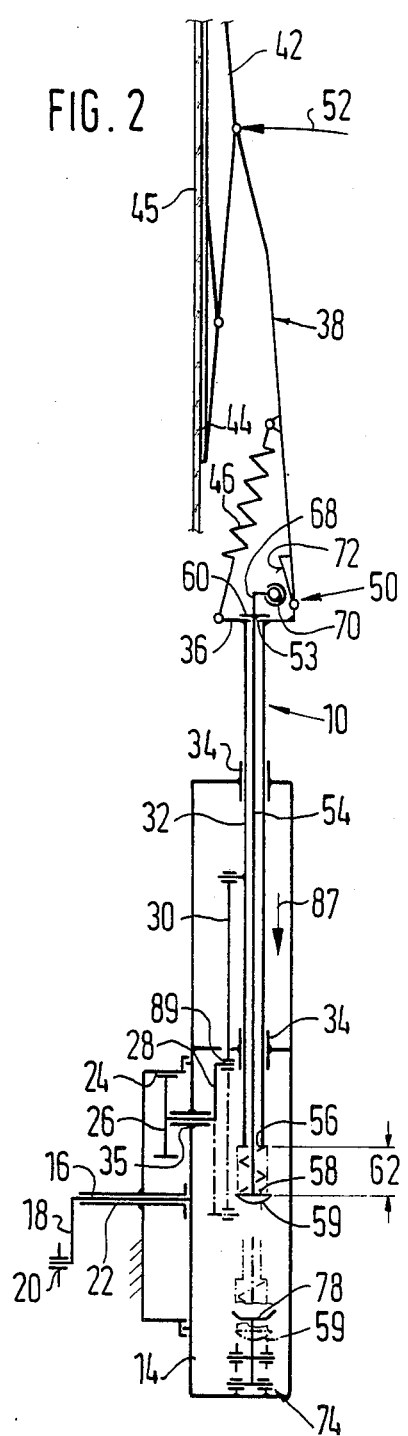

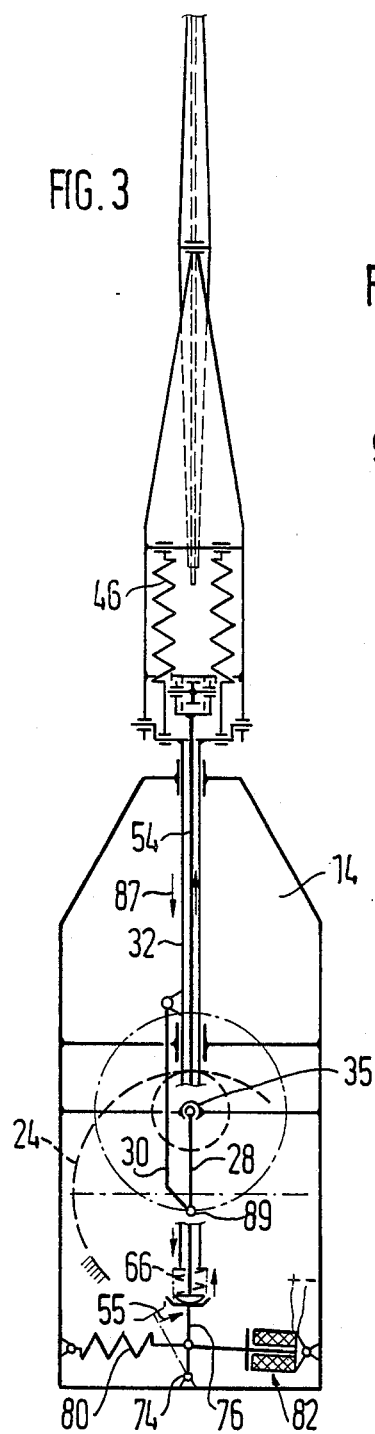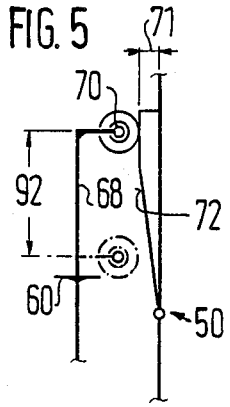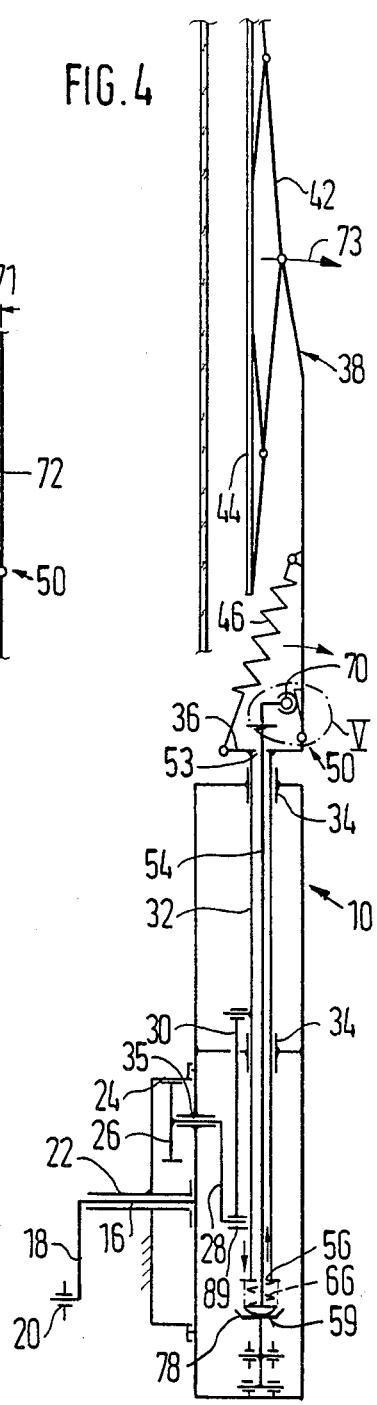

WIPING DEVICE FOR WINDOWS OF POWER VEHICLES

BACKGROUND OF THE INVENTION

The present invention relates to a wiping device for windows of power vehicles. More particularly it relates to wiping devices which include a swingably movable wiping lever, a guiding piece connected with a swinging shaft, an elongated lifting element which extends radially to a swinging axis and has a wiper arm provided with a wiping blade.

Wiping devices of the above mentioned general type are known in the art. One of such wiping devices is disclosed, for example, in the German document DE-PS No. 2,217,307. In the wiping device disclosed in this document, the pressure which presses the wiping blade against the window pane required for a satisfactory wiping quantity remains active also when the wiping device is turned off and the wiping blade is located in so-called storing or parking position. Action of weather upon rubber-like wiping strips provided in the wiping blade leads often to their deterioration so that they become unusable, since they are altered by deformation under the action of the above pressure. They do not fulfill their functions despite the fact that a mechanical wear does not take place or take place only to a small extent.

In another wiping device disclosed in the U.S. Pat. No. 2,306,980, the swingably driven wiping blade is unloaded from the pressure in its storage position in that the wiper arm runs on an inclined plane which is turnable in the storage position of the wiper arm. Depending on the height of the ramp-shaped inclined plane, the wiping blade is unloaded or completely removed from the pane.

The existing wiping devices can be further improved in many aspects.

SUMMARY OF THE INVENTION

Accordingly, it is an object of the present invention to provide a wiping device of the above described general type which is a further improvement of existing devices.

More particularly, it is an object of the present invention to provide a wiping device in which the pressure of a wiping blade against the pane is achieved by arrangement of integrated means in the wiper arm, and changes in chassis can be avoided.

In keeping with these objects and with others which will become apparent hereinafter, one feature of the present invention resides, briefly stated, in a wiping device which comprises a swingably movable wiping lever, a swinging shaft having a swinging axis, a guiding piece connected with the swinging shaft, an elongated lifting element which is radially displaceable relative to the swinging axis, and has an end which faces away from the swinging axis, a wiper arm articulately connected with the side of the lifting element, a wiping blade arranged on the wiper arm, a spring element arranged to press the wiping blade against a pane to be wiped, so that the wiping blade is subjected via the wiper blade to a swinging movement and via the lifting element to a displacement movement which is superposed upon the swinging movement and extends transversely to the swinging movement, the lifting element being provided with a movable abutment shoulder which extends transverse to its direction of elongation, the guiding piece having a rear counter shoulder as considered in direction of movement of the lifting element and cooperating with the abutment shoulder, the abutment shoulder abutting against the counter shoulder and being in working connection with the wiping blade so that its relative movement relative to the wiping blade acts upon the wiping blade against a pressing action of the spring element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a plan view schematically showing a wiping device in accordance with the present invention, with a wiping blade pressed against a window pane to be wiped;

FIG. 2 is a side view of the wiping device of FIG. 1;

FIG. 3 is a view substantially corresponding to the view of FIG. 1 with a wiping blade lifted from the window pane;

FIG. 4 is a side view of the wiping device shown in FIG. 3; and

FIG. 5 is an enlarged partial view of a fragment identified with reference numeral V in FIG. 4.

DESCRIPTION OF A PREFERRED EMBODIMENT

A wiping device shown in FIGS. 1 and 2 has a wiping lever 10 which in operation performs a swinging movement identified with double arrow 12. The wiping lever 10 has a guiding piece 14 with a swinging shaft 16 mounted in the latter. The swinging shaft 16 is shown only in FIG. 2 for the sake of clarity. The swinging shaft 16 has an end which faces away from the guiding piece 14 and is provided with a rocker 18. A crank 20 which forms a part of a swinging transmission is articulately connected with the rocker 18.

The swinging shaft 16 is supported in a bearing 22 which is fixed to a chassis. The swinging shaft 16 is surrounded by a concentrically arranged toothed segment 24 which is fixedly connected with the frame. It is clearly seen in FIG. 1. The toothed segment 24 has inner teeth and engages by its inner teeth with a pinion 26 which is rotatably supported on the guided piece 14 by a member 35. A crank 28 is formed on the pinion 26 and articulately connected with one end of a connecting rod 30. The other end of the connecting rod 30 is articulately connected with a lifting element 32.

The lifting element 32 which is a part of the wiping lever 10 is guided displaceably in its longitudinal direction in a sliding bearing 34 of the guiding piece 14. One of the lifting elements 32 is located in the vicinity of the swinging 16. The other end of the lifting element 32 extends outwardly beyond the guiding piece 14. It is provided with a wall 36 shown in FIG. 2. A wiper arm 40 which is a part of a window wiper 38 is articulately connected with the wall 36. The free end of the wiper arm 40 carries a wiping blade 42 which is articulately connected with the same. The wiping blade 42 is provided with a wiping strip 44 which is composed of a rubber-like material and abuts against a window pane 45 to be wiped, for example a windshield pane of a power vehicle.

For pressing the wiping blade 42 with the required force against the pane 45, spring elements 46 are arranged on the wall 36 and formed as two helical pulling springs shown in FIG. 1. The other ends of the spring elements 46 are connected with the wiper arm 40. They overlap a pivot point 50 which is provided between the wiper arm 40 and the lifting element 32 and lies with its pivot axis at least approximately in a plane extending parallel to the pane 45. By a respective pretensioning of the helical pulling springs 46, the wiping arm 40 and thereby the wiping blade 42 is tensioned in direction of the arrow 52 against the pane 46 to be wiped as shown in FIG. 2.

The lifting element 32 is formed tubular. An arm 54 passes through it and extends with its both ends outwardly beyond the lifting element 32. The arm 54 is displaceably guided in bearing points 53, 56 of the lifting element 32. One end of the arm 54 which extends outwardly beyond the end of the lifting element 32 is provided with an abutment 56 which prevents that the arm 54 can be withdrawn from the lifting element 32. For the same reason, the other end of the arm 54 is provided with an abutment 60. The length of the lifting element 32 is shorter than the distance between the proximal abutment surfaces of the abutments 58 and 60, so that a predetermined maximal displacement path 62 is provided.

A pretensioned helical pressure spring 66 surrounds the arm 54 and is located between the abutment 58 and the associated end of the lifting element 32. The helical pressure spring 66 forms an elastic structural member. The helical pressure spring 66 holds an abutment 60 for abutting by the lifting element 32 or the wall 36 which belongs to the lifting element 32. The arm 54 has an extension 68 in this region, and a rolling element 70 which faces toward the wiper arm 40 is rotatably supported on the extension 68. The rolling element 70 cooperates with a sliding path 72 which converges with a longitudinal axis of the arm 54 toward the wiping blade 42. Further, a support 76 is turnably supported on the guiding piece 14 in a bearing point 74. The pivot axis of the bearing point 74 extends transversely to the displacement direction of the arm 54 in the lifting element 32. The free end of the support 76 which faces away from the bearing point 74 is formed as a cup-shaped counter shoulder 78. A pretensioned pulling spring 80 which is mounted with its one end on the guiding piece 14 holds the support 76 outside of the displacement direction of the arm 54. The end displacement position of the arm 54 is shown in FIG. 3 in dash-dot line. The support 76 has a side which is opposite to the spring 80 as considered relative to the longitudinal axis of the arm 54. An auxiliary aggregate 82 which is formed as an electromagnet is arranged on this side of the support 76. A magnet armature 84 of the auxiliary aggregate 82 is also connected with the support 76. The electromagnet 82 is designed so that its pulling force which is applied to the armature 84 supersedes the pretensioning of the spring 80. A stroke 86 of the magnet armature 84 is dimensioned so that the counter shoulder 78 of the support 76 extends exactly into the displacement path of the lifting element 32 or the end of the arm 54 which is formed as the abutment 58, when the magnet coil of the electromagnet 82 is under current.

The wiping operation of the wiping device in accordance with the present invention is described hereinbelow. When the not shown swinging transmission of the rocker 18 can swing the swinging shaft 16 about its axis, the swinging movement is transmitted to the wiping lever 10 which performs respectively the swinging movement in direction of the double arrow 12. During this swinging movement the pinion 26 rolls in the toothed segment 24, so that the crank 28 rotates in the direction 29 about the bearing point 25 of the pinion 26. The rotary movement is transferred via the connecting rod 30 to the lifting element 32 as a displacement movement identified with the double arrow 27 in FIG. 1. The swinging movement 12 overlaps a displacement movement 27, and these two movements are determined relative to another so that the pane 45 to be wiped is cleaned near the edge. During the wiping operation the lifting element 32 and the arm 54 together perform the displacement movement in correspondence with the arrow 27, while the spring 36 holds the arm 54 with its abutment 60 firmly against the wall 36. The arm 54 can therefore be considered together with the spring 66, as a part of the lifting element 32. When the drive of the wiping device is turned off and the wiper lever 10 is located substantially in its position shown in FIG. 1, the electromagnet 82 is energized and pulls the magnet armature 84 in. It turns thereby the support 76 with its counter shoulder 78 from a rest position located outside the movement path of the lifting element 32, 54, 66, against the force of the spring 80 in the displacement region of the lifting element 32 or the arm 54 as shown with arrow 55 in FIG. 3. Thereby during further turning of the wiper lever 10 in its swinging reverse position which is a storage position, the lifting element 32 with its spherical side 59 facing away from the abutment 58 comes to abutment against the counter shoulder 78 of the support 76. The cup-shaped design of the counter shoulder 78 provides for a certain form-locking between the abutment shoulder 59 and the counter shoulder 78. The side 59 of the abutment 58 forms an abutment shoulder which extends transversely to the longitudinal direction of the lifting element 32 and cooperates with the counter shoulder 78 of the support. Since in the course of returning movement of the wiper lever 10, the lifting element 32 and also the arm 54 are moved further in direction of the arrow 87, but the support 76 is prevented from a further displacement of the arm 54, the helical pressure spring 66 is compressed, and a relative movement between the abutment shoulder 59 and the lifting element 32 takes place. This relative movement is naturally performed also between the roller element 70 and the associated sliding path 72, and in particular contrary to the direction of the arrow 87. The rolling element 74 runs against the sliding path 72 as shown in FIG. 5 and thereby presses the wiper arm 40 in direction of the arrow 73 as shown in FIG. 4 about the pivot 50 between the lifting element 32 and the wiper arm 40, so that the wiping blade 42 is lifted from the pane 45. The maximum lifting movement of the lifting element 32 is determined by the diameter of a circle 88 described by the pivot 89 between the crank 28 and the connecting rod 30. The value of the relative movement 92 in FIG. 5 between the wiping blade 52 and the rolling element 77 of the arm 54 is produced from the value of the magnitude by which the helical pressure spring 66 is compressed when the counter shoulder 78 arrives in the displacement region of the abutment shoulder 79.

By the lifting movement identified by arrow 73, the wiping blade 42 or its wiping strip 44 is released from the pressure applied by the spring element 46 or at least unloaded. The value of the unloading depends upon the size 71 of the sliding path 72.

The lifting element 32, 54, 66 also has an abutment shoulder 59 extending transversely to its displacement direction 27. The abutment shoulder 59 cooperates with the counter shoulder 78 of the guiding piece 14 which is rearward as considered in the movement direction. The abutment shoulder 59 abutting against the counter shoulder 78 is operatively connected with the wiping blade 42 so that their relative movement relative to the wiping blade 42 moves it against the abutment tension 52 of the spring element 46.

The inventive arrangement provides for a high operational safety, since all functional elements are arranged in the housing-like guiding piece 14 so as to be protected from environment. Furthermore, the inventive wiping device can provide interval operation without problems, since the abutment unloading is activated first during turning off of the wiping device or in other words energizing of the electromagnet 82. It is, therefore, possible to turn off the electromagnet 82 after stoppage of the wiping device so as to deenergize the electromagnet, since the strongly prestressed helical pressure spring 66 holds the support 76 in its operative position activated by the electromagnet 82. During next turning on of the wiping device, again full pressing force for the wiping blade 42 is positively provide, since during next running and thereby movement of the lifting element 32 against the arrow 86, the pulling force of the spring 80 exceeds the clamping force of the helical pressure spring 66 and thereby pulls the support 76 out from the displacement path of the lifting element 32 or the arm 54. Thereby the arm 54 reaches again its operative position in FIGS. 1 and 2 relative to the lifting element 32, in which position the rolling element 70 lies freely against the sliding path 72 of the wiping arm 40. The spring element 46 also pulls the pane wiper 38 composed of the wiper arm 40 and the wiping blade 42, in direction of the arrow 52 against the pane 45 to be wiped.

It will be understood that each of the elements described above, or two or more together, may also find a useful application in other types of constructions differing from the types described above.

While the invention has been illustrated and described as embodied in a wiping device for windows of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A wiping device for windows of power vehicles, comprising a swingably movable wiping lever comprising a swinging shaft having a swinging axis; a guiding piece connected with said swinging shaft and an elongated lifting element which is radially displaceable relative to said swinging axis, said lifting element having an end which faces away from said swinging axis; the wiping device further comprising a wiper arm articulately connected with said end of said lifting element; a wiping blade arranged on said wiper arm; a spring element arranged to press said wiping blade against a pane to be wiped, so that said wiping blade is subjected via said wiping lever to a swinging movement and via said lifting element to a displacement movement which is superposed upon said swinging movement and extends transversely to said swinging movement, said lifting element being provided with a movable abutment shoulder which extends transverse to its direction of elongation, said guiding piece having a rear counter shoulder as considered in direction of movement of said lifting element and cooperating with said abutment shoulder, said abutment shoulder abutting against said counter shoulder and being in working connection with said wiping blade so that a movement of said abutment shoulder relative to said wiping blade acts upon said wiping blade against a pressing action of spring element, said lifting element including a tubular and an arm which passes through said tubular element element and has one end which faces away from the wiping blade and another end, said one end of said arm being provided with said abutment shoulder, said wiper arm and said wiping blade together forming a pane wiper with which the other end of said arm cooperates.

2. A wiping device as defined in claim 1, wherein said other end of said arm extends outwardly beyond said tubular element, said arm having a longitudinal axis; and further comprising a sliding path member which converges with said longitudinal axis of said arm toward said wiping blade, said other end of said arm being displaceable against said sliding path member.

3. A wiping device as defined in claim 2, wherein said other end of said arm is provided with a rolling element cooperating with said sliding path member.

4. A wiping device as defined in claim 1, wherein one of said ends of said arm extends outwardly beyond said tubular element; and wherein the lifting element comprises an elastic structural member which engages said arm with a pretensioning and loads the same away from said wiping blade.

5. A wiping device as defined in claim 4, wherein said elastic structural member is formed as a helical pressure spring, said tubular element having an end which faces toward said abutment shoulder, said helical pressure spring surrounding said arm and being arranged between said abutment shoulder and said end of said tubular element which faces toward said abutment shoulder.

6. A wiping device as defined in claim 5, wherein said arm is longitudinally displaceable inside said tubular element; and further comprising two limiting abutments arranged to limit said displacement of said arm in said tubular element, each of said limiting abutments being arranged at a respective one of said ends of said arm.

7. A wiping device as defined in claim 6, wherein said helical pressure spring is arranged so that it holds one of said limiting abutments against said lifting element.

8. A wiping device as defined in claim 1, wherein said spring element is formed as a helical pulling spring having one end connected with said lifting element and another end connected with said wiper arm, said lifting element and said wiper arm being connected with one another by a pivot which has a pivot axis located at least close to a plane which is parallel to the pane.

9. A wiping device as defined in claim 1; and further comprising a spring having a spring force, said counter shoulder for said abutment shoulder of said lifting element being formed as a support which is turnably supported on said guiding piece at a supporting point, said support having an end which faces away from said supporting point and acts as said counter shoulder, said counter shoulder being turnable from a rest position lying outside a movement path of said lifting element, against said spring force of said spring into the movement path of said lifting element.

10. A wiping device as defined in claim 9; and further comprising an auxiliary unit arranged on said guide piece and acting for turning said counter shoulder.

11. A wiping device as defined in claim 10, wherein said auxiliary unit is formed as an electromagnet with an armature connected with said support.

12. A wiping device as defined in claim 11, wherein said armature is articulately connected with said support; and further comprising means for articulating said armature of said electromagnet with said support.

* * * * *